(12) United States Patent
Nysen

(10) Patent No.: US 6,995,654 B2
(45) Date of Patent: Feb. 7, 2006

(54) APPARATUS AND METHOD FOR LOCATING A TAGGED ITEM

(75) Inventor: Paul Nysen, Sunnyvale, CA (US)

(73) Assignee: X-Cyte, Inc., San Jose, CA (US)

( * ) Notice: Subject to any disclaimer, the term of this patent is extended or adjusted under 35 U.S.C. 154(b) by 198 days.

(21) Appl. No.: 09/738,819

(22) Filed: Dec. 15, 2000

(65) Prior Publication Data
US 2002/0075152 A1 Jun. 20, 2002

(51) Int. Cl.
G08B 29/00 (2006.01)
(52) U.S. Cl. .................... 340/7.1; 340/571; 340/572.1; 340/5.1; 340/10.1; 340/825.49; 340/825.36; 340/7.2; 340/7.29; 340/7.28
(58) Field of Classification Search ............... 340/5.71, 340/571, 571.2, 7.1, 5.9, 825.49; 455/456, 455/457
See application file for complete search history.

(56) References Cited

U.S. PATENT DOCUMENTS

| | | | |
|---|---|---|---|
| 3,273,146 A | 9/1966 | Hurwitz, Jr. | |
| 3,706,094 A | 12/1972 | Cole et al. | |
| 3,755,803 A | 8/1973 | Cole et al. | |
| 4,058,217 A | 11/1977 | Vaughan et al. | |
| 4,059,831 A | 11/1977 | Epstein | |
| 4,484,160 A | 11/1984 | Riha | |
| 4,604,623 A | 8/1986 | Skeie | |
| 4,605,929 A | 8/1986 | Skeie | |
| 4,620,191 A | 10/1986 | Skeie | |
| 4,623,890 A | 11/1986 | Nysen | |
| 4,625,207 A | 11/1986 | Skeie | |
| 4,625,208 A | 11/1986 | Skeie et al. | |
| 4,703,327 A | 10/1987 | Rossetti et al. | |
| 4,724,443 A | 2/1988 | Nysen | |
| 4,725,841 A | 2/1988 | Nysen et al. | |
| 4,734,698 A | 3/1988 | Nysen et al. | |
| 4,737,789 A | 4/1988 | Nysen | |
| 4,737,790 A | 4/1988 | Skeie et al. | |
| 4,951,057 A | 8/1990 | Nagel | |
| 5,095,240 A | 3/1992 | Nysen et al. | |
| 5,182,570 A | 1/1993 | Nysen et al. | |
| 5,576,692 A * | 11/1996 | Tompkins et al. | .......... 340/571 |
| 5,684,859 A * | 11/1997 | Chanroo et al. | .............. 379/58 |
| 6,236,836 B1 * | 5/2001 | Westman et al. | .......... 455/38.3 |
| 6,342,836 B2 * | 1/2002 | Zimmerman | ................ 340/571 |
| 6,412,086 B1 * | 6/2002 | Friedman et al. | ........... 714/733 |
| 6,424,928 B1 * | 7/2002 | Elliott et al. | ................ 702/151 |

* cited by examiner

*Primary Examiner*—Brian Zimmerman
*Assistant Examiner*—Vernal Brown
(74) *Attorney, Agent, or Firm*—Thelen Reid & Priest LLP

(57) ABSTRACT

An apparatus and method for determining the location of an item from a plurality of like items, using matching paging devices and passive transponder tags on each item. The unique code number (IC) of the tag is programmed into its matching paging device. The paging device operates remote control location functions. The tags are preferably passive acoustic wave transponders.

19 Claims, 2 Drawing Sheets

APPARATUS AND METHOD FOR LOCATING A TAGGED ITEM

FIELD OF THE INVENTION

The present invention relates to an apparatus and method for determining the location of an item from a plurality of like items within an environment: items such as boxes or containers within a warehouse, files within a file room, people within a building, and parts within an assembly plant. The invention also relates to the simulation of an active tagging system by utilizing an existing commercial paging system, paging components and location finding components. A passive tagging system is also preferably used to locate individual tagged items which are, or may be, separated from other passively tagged items.

BACKGROUND OF THE INVENTION

A known radio-frequency passive acoustic transponder system imparts a radio-frequency surface acoustic wave on a piezoelectric substrate which interacts with elements on the substrate to produce an individualized complex waveform response to an interrogation signal. These piezoelectric devices (transponder "tags") present an identification code as a characteristic time-domain delay pattern in the signal re-transmitted from the transponder. The identification code space for these devices may be $2^{16}$ codes, or more, allowing a large number of these tags to be produced without ID code re-use.

These transponder tag devices do not require a semiconductor memory nor an external electrical energy source, such as battery or capacitor, to operate.

Systems for interrogating such passive transponder tags, carrying amplitude and/or phase-encoded information, are disclosed in, for example, U.S. Pat. Nos. 4,059,831; 4,484,160; 4,604,623; 4,605,929; 4,620,191; 4,623,890; 4,625,207; 4,625,208; 4,703,327; 4,724,443; 4,725,841; 4,734,698; 4,737,789; 4,737,790; 4,951,057; 5,095,240; and 5,182,570, all of which are expressly incorporated herein by reference. Systems of this type are commercially available from X-cyte, Inc., San Jose, Calif., USA.

Other types of passive remotely readable information bearing tags include bar codes, color codes and other types of radio-frequency devices. Some of these are disclosed in the U.S. Pat. Nos. 3,273,146, 3,706,094, 3,755,803, and 4,058,217, which are also incorporated herein by reference.

Known wireless communications systems include various cellular standards (IS-41, IS-95, IS-136, etc.) as well as so-called PCS standards and data-only standards, including Cellular Packet Data Protocol (CPDP). The Metricom "Ricochet" system provides a frequency hopping 915 MHz spread spectrum wireless local data access system. These communications standards, due to their extensive infrastructure, allow a large number of simultaneous users to communicate over separate communications channels within a relatively small band without substantial mutual interference. Therefore, communications channels may be appropriated for near real time communications needs, such as voice and navigational data.

An inventory tracking system commercially available from Savi, Inc., of Sunnyvale, Calif., permits the location of tagged items within a confined area, such as a warehouse. With this system, an active, battery-equipped tag is placed on each item (e.g. container) and a special purpose interrogator transmits to all such tags within a defined area.

Further, commercial paging systems are known which transmit a paging "address" via satellite to a large area or region of the globe to identify a particular paging receiver within this region. Such a system then transmits commands and alphanumeric information to the paging receiver which is addressed. The paging receiver or "pager" can beep, vibrate or otherwise call attention to the fact that it has been addressed, and will display the alphanumeric information or issue simulated voice sounds corresponding to this information.

Finally, a number of different systems are known which can be utilized to locate an item in space. For example, the omnidirectional transmission of an easily detectable signal, such as an RF, infrared or ultrasound signal, has been used to locate the source of transmission by triangulation. Such known systems are either less than accurate or are relatively expensive.

Notwithstanding these known technologies for "tagging" and "locating" various items, such as part containers, files and even people, no system is known which allows such items to be tagged, detected and located to within a few feet, within a substantially large coverage area, e.g. for inventory control, asset management, personnel security or the like.

SUMMARY AND OBJECTS OF THE INVENTION

It is therefore a principal object of the present invention to provide an apparatus and method for locating items within a few feet within substantially large coverage area. A further object of the invention is to provide a system and method of the aforementioned type which exhibits an essentially unlimited range. A still further object is to provide a location system which is both accurate and inexpensive.

These objects, as well as other objects which will become apparent from the discussion that follows, are achieved, in accordance with the present invention, utilizing components of existing commercial paging systems and remote control systems, as well as known passive tag identification systems. This is achieved by locating a paging device on each item or asset to be identified and providing a system for locating the specific paging device which is addressed. If desired, a passive, transponder tag may also be co-located on the item. A wide area pager transmission, utilizing a satellite for example, communicates with the paging device which, in turn, may communicate with the tag.

The location identifying functions may include RF, IR or ultrasound transmission location systems which locate by triangulation using relative amplitude, differential time or differential phase of an omnidirectional transmission received at a plurality of points.

For a full understanding of the present invention, reference should now be made to the following detailed description of the preferred embodiments thereof, taken in conjunction with the accompanying drawings.

DETAILED DESCRIPTION OF THE PREFERRED EMBODIMENTS

Figure 1:
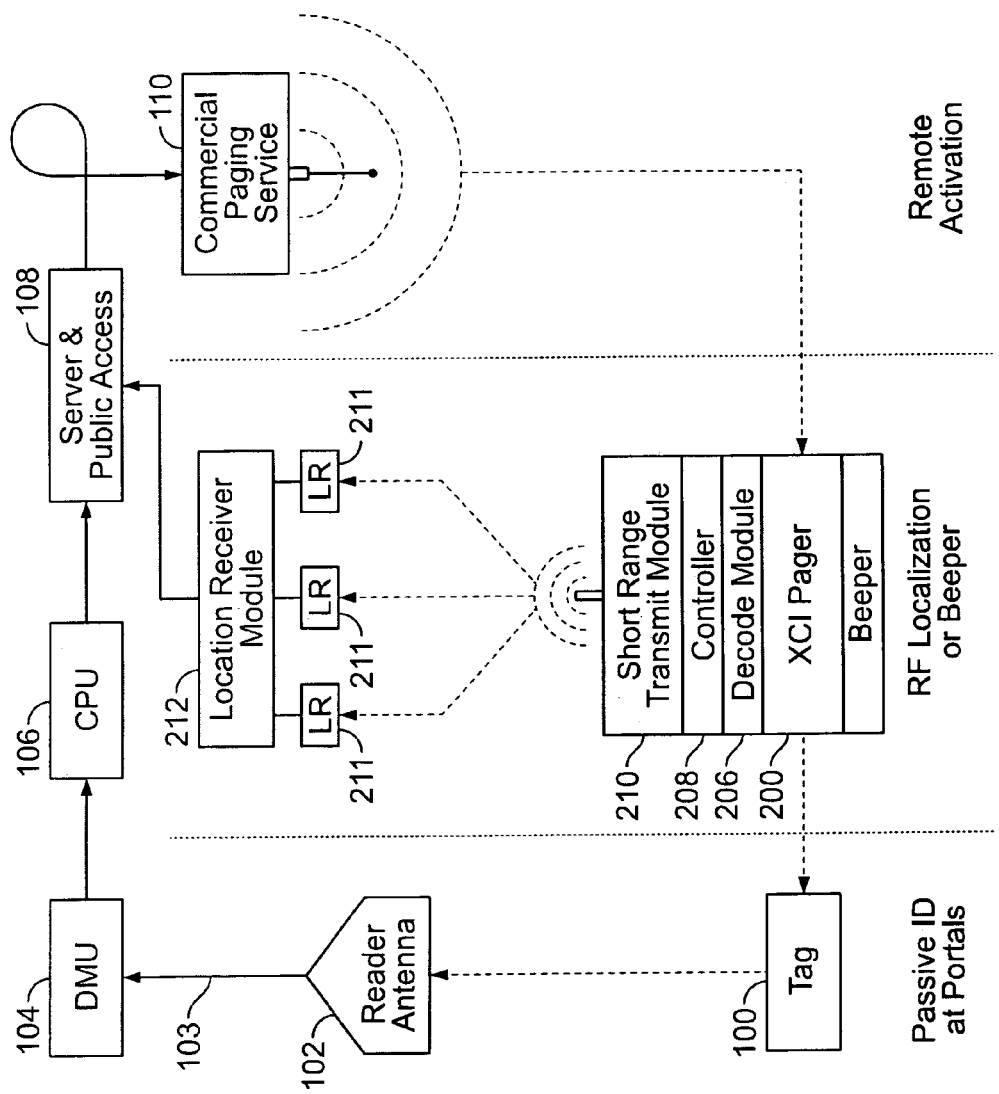
FIG. 1 is a schematic diagram showing the preferred embodiment of the apparatus and method of the present invention.

The preferred embodiments of the present invention will now be described with reference to FIGS. 1–2 of the drawings. Identical elements in the various figures are designated with the same reference numerals.

Passive transponder systems currently in use to identify items cannot distinguish between the simultaneous responses of two or more tags. Though more expensive solutions may be found, the present invention provides an inexpensive system, using currently conventional components, coupled with a wider area of use than current passive transponder tag systems. This is achieved by locating a paging device or "pager" on each unique item to be tagged, such as a part, pallet, container, box, file or person. The address of each paging device is stored in a computer, along with the identity of the item to which it is attached.

Advantageously, each item provided with a paging device is also tagged with a passive, interrogatable transponder tag, for example of the type described above. Thus, a matching transponder tag/paging device pair is co-located on each item.

FIG. 1 illustrates the merger of a passive tag system, a wide area paging system, and a short-range transmission system to locate a unique tagged item. FIG. 2 expands upon the disclosure of the paging device, and its relationship with the short-range locator system, and the tag.

Transponder tag 100 in FIG. 1 has a unique identification code number, or ID. This ID, or another unique address, is programmed into a paging device 200 and the matching pair is co-located on an item, such as an item in inventory. In a preferred embodiment, the passive transponder tag 100 is a passive surface acoustic wave transponder. A description of such a device may be found in the aforementioned U.S. Pat. No. 4,734,698. Likewise, the preferred receiver apparatus for producing the tag identification (ID) from the interrogating signal and the transponder reply signal for use in the system of the present invention, is described in the aforementioned U.S. Pat. No. 4,703,327.

Figure 2:
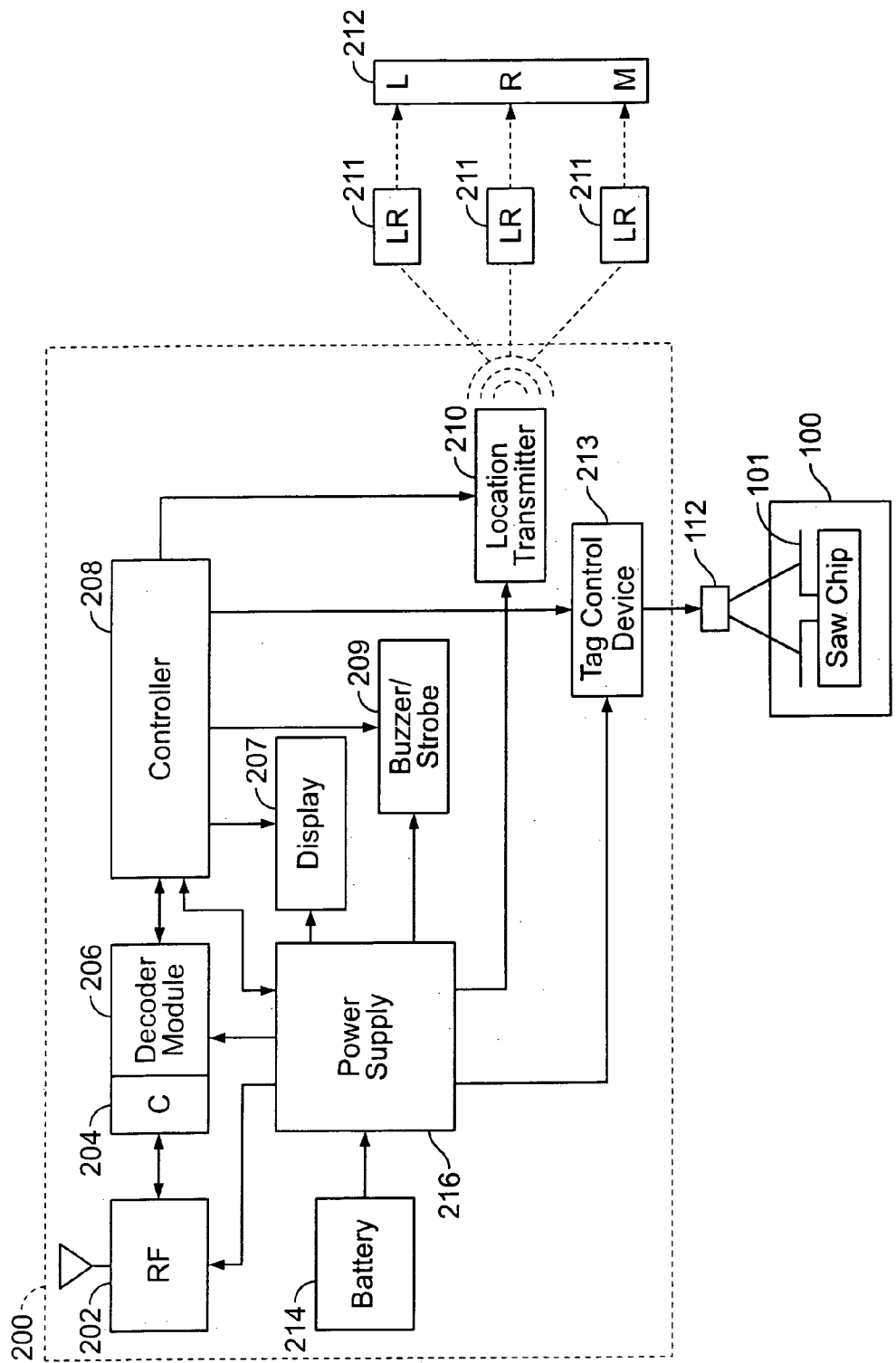
FIG. 2 is a block diagram showing the preferred embodiment of the paging device of the present invention.

The paging device 200 is illustrated more fully in FIG. 2. It has an antenna 202 for receiving the paging signal, which consists of an address and one or more command messages. Each paging device also has a comparator 204 which compares the address information carried on the RF signal received with the address of the paging device. When the received signal contains the address of the paging device, the subsequent message or command(s) is/are passed to a decoder 206 which deciphers the next command and sends it to the controller 208. The controller controls several functions of the paging device in dependence upon the command(s) received. Typical commands recognized by the paging device are:

1. Power up; that is, activate paging device from minimum power level.
2. Power down; that is, inactivate paging device so as to draw minimum power.
3. Display alphanumerics, which may be transmitted following an initial command;
4. Activate an audible alarm.
5. Activate a strobe light.
6. Transmit an omnidirectional signal to facilitate finding the location of the paging device.
7. Deactivate a co-located passive transponder tag.

If the commands (1) or (2) are received, the controller sends an appropriate control signal to the power supply 216. If the command (3) is received, the controller 208 sends the alphanumerics to an LCD display 207. If the commands (4) or (5) are received, the controller activates the buzzer/strobe device 209.

A command (6) to find the location of the paging device 200 results in the activation of the location transmitter 210. This transmitter 210 transmits a signal, such as a pulse, a pilot tone or other short duration signal (RF, ultrasound or IR), which may contain a code, a unique ID or the address of the paging device. The location of the paging device may then be determined by means of triangulation based on the relative amplitude, the differential time or the differential phase of the signal received at three or more locations by receivers 211 and a computer 212.

Finally, the controller 208 may receive a command (7) to deactivate a co-located, passive, transponder tag. Such a command may be sent to a group of paging devices and co-located tags in the same geographical area, to determine which paging device has a dead battery. By causing all the paging devices in the area which are still active to switch off their co-located tags, the one paging device that cannot switch off its tag may be identified by interrogating all of the tags in that area. The one which responds—that is, the one which has not been turned off—reveals that its co-located paging device is inactive (faulty or "dead").

In this instance, the controller 208 controls a tag control device 213 for assisting in determining if the battery 214 in this paging device is still working. This is done by shorting out or otherwise turning off the transponder tag 100. In the embodiment of FIG. 2, this is accomplished by supplying a gate level voltage to a GaAsFET transister 112 connected across the leads of the antenna 101 of the transponder tag. The GaAsFET functions as a switch, shorting out the antenna leads and thus silencing the tag. If the battery of the instant paging device has lost power, the switch will remain open, and the tag will remain functional.

Initiation of an interrogator signal will yield a response from only those transponder tags co-located with a paging device that has a non-working battery. The interrogator signal may be initiated from the reader antenna, or another transmitter, such as a hand-held transmitter. It should be noted that the reader antenna for the transponder response signals must be located in the general area in which the unique item may be found.

Reader antenna 102 located within the general area of the tags 100 receives the interrogation response signals of the transponder tags 100. A tag response signal (and possibly other signals mixed therewith) is passed by line 103 to a detector module unit (DMU) 104 and logic unit, here CPU 106, both of which may be located at a distance from the reader antenna. The DMU 104 and CPU 106 determine the ID of the tag from its response to an interrogator signal. This ID may then be used by the commercial paging service to broadcast a command directly to the paging device programmed with the proper address. The address of the paging device co-located with the transponder tag is stored in the CPU 106 and retrieved by accessing the ID of the transponder tag.

Thus, rapid response to a passively tagged item is achieved. As an alternative to the location method and apparatus of the present invention, other transponder tag locating systems may also be used to locate the paging devices with the dead batteries.

The paging device 200 also includes functions which assist in locating the particular item. For instance, the paging device may have a buzzer that may be activated to assist in locating the desired item by sound. Buzzers are currently used to signal those carrying paging devices, but in this instance would be used to locate the item with the co-located tag and paging device pair. Infra-red (IR) and/or ultrasound waves may also be used to locate a paging device, and the controller may issue a command to the short range location RF transmitter 210 to issue such a locator signal.

If desired, a so-called Firefly Locator System may be used.

The Firefly tag is a sealed module about 2.5' square by 1' high. It operates at 2.45 GHz using a spread spectrum technique to localize the unit to within 10 feet of its position. The battery lifetime can be up to 7 years if the blink rate is set to several minutes. This localization system consists of several receiver modules that detect the random transmissions from the various tags in the controlled area and uses them to identify and localize the tag.

It may well be desired that the paging devices have a display, to display, e.g. the UBC, or the order number, or the purchaser, or the shipping address for the tagged item. In addition, use and maintenance of the apparatus may be enhanced by including an additional RAM memory (not shown) in the paging device.

To locate an item, initiation of the system resources may be begun at the commercial paging service 110 or the server 108 which controls the paging system components. The commercial paging system transmits a signal over a wide area. The signal contains at least the unique paging device address (matching the ID of the transponder tag co-located with the item to be located), and a command. Thus, rapid location of a passively tagged item is achieved.

The specifically targeted message may consist of a command, such as activation of the location transmitter, 210. This form of the command, and the operation of the transmitter may utilize various remote control modules to transmit the locator signal. The locator signal is picked up by the location receivers 211 connected to the Location Receiver Module 214 which comprise the locator device of this preferred embodiment. The locator device determines the location of the uniquely tagged item by triangulation or some other method.

This location information may be used by automated or manual retrieval methods from inventory or simply to retrieve an item. In some instances it may be advantageous to include an additional locator function in the paging device, such as turning on the overhead lights of the warehouse, directly above the item, and/or turning on a light in the display.

It may also be advantageous to include other functions in the paging device, such as a clock or delay, to disable the tags, or certain tags, for a specific period of time, i.e. to make them sleep for a predetermined period of time, so that other tasks may be performed. These other tasks could include changing the batteries, or, disabling an automated retrieval system, for example.

Use of the commercial paging service RF broadcasting ability yields an inventory control system with passive tags but enormous geographical coverage. In addition, paging technology is well developed, and the apparatus and system modules easily attainable, and easily implemented. Inventory requests could be implemented in a hierarchy, beginning with local paging networks, and proceeding to cell phone networks, and, if desired, satellite networks. Thus, geographical controls could become part of inventory control systems. Using the paging device technology to locate the particular tagged item provides a number of benefits, including simplicity and small size, as well as low cost and low power requirements.

There has thus been shown and described a novel method and apparatus for locating a tagged item. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. Apparatus for determining the location of an item, from among a plurality of like items, said apparatus comprising, in combination:
    (a) a paging device adapted to be located on or near said item, said paging device having a unique paging device identification code and including:
        (1) an RF receiver for receiving and detecting RF transmissions from a commercial paging service, said RF transmissions including a paging device identification code for a particular paging device and a paging message associated therewith;
        (2) a comparator, connected to said RF receiver, for determining when the paging device identification code received from the commercial paging service equals the paging device identification code for the respective paging device;
        (3) a decoder, connected to the RF receiver and the comparator, for decoding the paging message when enabled by said comparator, one of said paging messages including a command to emit a locator signal;
    (b) a locator transmitter, adapted to be co-located with said item and said paging device and being connected to said paging device, said locator transmitter producing a locator signal in response to a command from said paging device; and
    (c) a locator device, within range to receive said locator signal, for determining the location of said locator transmitter;
    (d) a transponder tag, adapted to be co-located on or near said item with said paging device, said tag having means for emitting an RF signal in response to an RF interrogation, said RF signal containing a unique tag identification code;
    (e) a transponder reader for producing an RF interrogation for a transponder tag, for receiving an RF signal from a tag in response to such interrogation and for decoding the tag identification code from said RF signal; and
    (f) a computer coupled to the transponder reader and having stored therein, in association with each other, both the paging device identification code and the tag identification code.

2. The apparatus defined in claim 1, wherein the transponder tag utilizes energy from said RF interrogation to transmit said RF signal, whereby said transponder tag requires no other power source.

3. The apparatus defined in claim 1, wherein one of said paging messages includes a command to switch off the co-located tag, and wherein said apparatus further comprises a tag control device, connected to said paging device and to said tag, for preventing said tag from responding to an RF interrogation when said switch off command is received by said paging device.

4. The apparatus defined in claim 1, further comprising a CPU, coupled to said transponder reader, for initiating a page by said commercial paging system.

5. The apparatus defined in claim 1, wherein said locator transmitter produces, and said locator device receives, a RF locator signal.

6. The apparatus defined in claim 1, wherein said locator transmitter produces, and said locator device receives, an infrared locator signal.

7. The apparatus defined in claim 5, wherein said locator transmitter produces, and said locator device receives, an ultrasound locator signal.

8. A system for locating a tagged item, comprising:
   a paging device attached or in close proximity to an item to be located, said paging device identified by a paging device address and having an RF receiver configured to receive paging signals from a paging system;
   a transponder tag containing a unique code identifying said item, said transponder tag attached or in close proximity to said item; and
   a transponder tag reader operable to receive an RF signal from said transponder tag and extract a tag identification code contained in said RF signal; and
   a computer configured to store said paging device address and said tag identification code.

9. The system of claim 8, further comprising a server configured to receive information signals from said transponder reader and communicate information concerning the item or transponder tag to said paging system.

10. The system of claim 8, further comprising a controller configured to receive a command signal from said paging device.

11. The system of claim 10 wherein said command signal contains a command to deactivate said transponder tag.

12. The system of claim 8 wherein said paging device includes a short-range transmit module configured to transmit a short-range location signal to a location receiver module having one or more receivers operable to determine the location of said paging device.

13. A system for determining the location of an item, comprising:
   a plurality of pagers associated with a plurality of items, each pager having a long range radio frequency communications module configured to communicate with a pager communications network, and a short range transmit module;
   a plurality of dispersed short range receiver modules configured to receive a location signal from the short range transmit module of one of said plurality of pagers;
   a plurality of transponder tags co-located and associated with said plurality of pagers; and
   a transponder tag reader configured to interrogate one or more of said plurality of transponder tags and receive interrogation response signals interrogation response signals from the interrogated transponder tags.

14. The system of claim 13 wherein each of said plurality of pagers further includes a controller configured to receive a command signal from said pager communications network.

15. The system of claim 14 the command signal causes a controller of at least one pager to generate a control signal that controls a power level of said at least one pager.

16. The system of claim 14 wherein the command signal causes a controller of at least one pager to generate a control signal that activates a visible or audible indicator of said at least one pager.

17. The system of claim 14 wherein the command signal causes a controller of at least one pager to deactivate the at least one pager's associated transponder tag.

18. The system of claim 14 wherein a controller of at least one pager controls a tag control device employed to determine whether a battery of said at least one pager is discharged.

19. The system of claim 14 wherein the location of the item is determined by triangulation, based on the relative amplitude, differential time, or differential phase of said location signal received by said plurality of dispersed short range receiver modules.

\* \* \* \* \*